US011813969B2

(12) United States Patent
Cahill et al.

(10) Patent No.: US 11,813,969 B2
(45) Date of Patent: Nov. 14, 2023

(54) FOLDABLE HEADREST SPRING COMPENSATOR (71) Applicant: Grammer AG, Ursensollen (DE)

(72) Inventors: Joseph Gordon Cahill, Washington, MI (US); Gerhard Delling, Schmidgaden (DE)

(73) Assignee: Grammer AG, Ursensollen (DE)

( * ) Notice: Subject to any disclaimer, the term of this patent is extended or adjusted under 35 U.S.C. 154(b) by 0 days.

(21) Appl. No.: 17/664,267

(22) Filed: May 20, 2022

(65) Prior Publication Data

US 2022/0371496 A1 Nov. 24, 2022

Related U.S. Application Data (60) Provisional application No. 63/191,353, filed on May 21, 2021.

(51) Int. Cl.
*B60N 2/856* (2018.01)
*B60N 2/853* (2018.01)

(52) U.S. Cl.
CPC ............. *B60N 2/856* (2018.02); *B60N 2/853* (2018.02)

(58) Field of Classification Search
CPC ................................ B60N 2/856; B60N 2/853
See application file for complete search history.

(56) References Cited

U.S. PATENT DOCUMENTS

| 5,178,034 A * | 1/1993 | Reasoner ................ F16C 1/262 |
| | | 74/501.5 R |
| 5,261,293 A * | 11/1993 | Kelley ...................... F16C 1/22 |
| | | 74/502.6 |
| 8,366,189 B2 * | 2/2013 | Schmitz ................. B60N 2/888 |
| | | 297/216.12 |
| 2004/0124686 A1 * | 7/2004 | Malsch .................. B60N 2/809 |
| | | 297/410 |
| 2010/0123344 A1 * | 5/2010 | Villeminey ............ B60N 2/874 |
| | | 297/391 |
| 2018/0326882 A1 * | 11/2018 | Bach ..................... B60N 2/2352 |

FOREIGN PATENT DOCUMENTS

| DE | 29614978 | 2/1997 |
| DE | 19728618 | 1/1999 |
| DE | 19912399 | 9/2000 |
| DE | 19940074 | 3/2001 |
| DE | 10024337 | 11/2001 |

(Continued)

*Primary Examiner* — Timothy J Brindley
(74) *Attorney, Agent, or Firm* — McHale & Slavin, P.A.

(57) ABSTRACT

An improvement to foldable headrests remote actuators by providing a tube mounted spring compensator to facilitate movement between a stowage position and an operating position. The spring compensator is inserted concentrically within the hollow tubes that support the adjustable headrests to boost or compensate for the lack of force routinely experienced under cold weather use or aging of materials. The spring compensator is positioned inside the headrest support tube to help pull the cable up through the seat when the seat and headrest are returned from a stowage position to a passenger seating position. The spring compensator inside the headrest support tube allows the use of a smaller torsion spring in the headrest and reduces the stress on the components in the mechanism.

8 Claims, 9 Drawing Sheets

(56) References Cited

FOREIGN PATENT DOCUMENTS

| | | |
|---|---|---|
| DE | 10304879 | 10/2003 |
| DE | 10339000 | 2/2005 |
| DE | 102004048910 | 4/2006 |
| DE | 102005006116 | 5/2006 |
| DE | 102006019176 | 10/2007 |
| DE | 102007041613 | 12/2008 |
| DE | 102009003814 | 11/2009 |
| DE | 102008055987 | 5/2010 |
| DE | 102012012657 | 12/2013 |
| DE | 102013010705 | 10/2014 |
| JP | 2008238875 | 10/2008 |

\* cited by examiner

Compression Spring - Cylindrical - Round Wire - 0001 ☒

Material: Music Wire ▼ [...]    Buckling Constraints: End fixation not known. ▼

Hand: ● Optional ○ Right ○ Left    End Type: ☑ Closed ☐ Ground    ☐ User-defined SN data [...]
Grade: ● Commercial ○ Precision    Condition: ☐ Preset ☐ Peened    ☑ Autoadjust Inactive Coils ● Power User    ○ Two Load  ○ One Load  ○ Rate Based  ○ Dimensional  ○ Min Weight    Note: Italicized labels
(Inputs for these five cases are indicated by green backgrounds)    indicate _optional_ inputs

| | | | | | | | | |
|---|---|---|---|---|---|---|---|---|
| Wire Diameter | 0.7112 | mm | Arbor Diameter | 3.9653 | mm | Active Coils | 60 | |
| Wire Dia. Tol. (=/-) | 0.0076 | mm | Coil D | 4.5776 | mm | Total Coils | 62.000 | |
| Wire Length | 1037.7191 | mm | Coil Mean Diameter | 5.2888 | mm | Dead Coils | 0.0000 | |
| Wire Weight | 0.00324 | kg | Coil OD | 6.0000 | mm | Pitch | 2.0478 | mm |
| Minimum Tensile Strength (MTS) | 2308 | MPa | Coil Dia Tol. (+/_) | 0.3000 | mm | Pitch Angle | 7.0261 | deg |
| Spring Rate | 0.2857 | N/mm | Min. Coil ID (Free) | 4.2776 | mm | Free Length Tol. (+/_) | 10.1647 | mm |
| Spring Index | 7.4364 | | Shaft Diameter | 1.5000 | mm | Allowable Solid Length | | mm |
| Natural Frequency | 151 | Hz | Hole Diameter | 6.5000 | mm | | | |

Wire Available: No    Next Smaller Wire: 0.7000    Next Larger Wire: 0.8000    Estimated Cycle Life: 6326477.78

| | Free | Cycle Load | Cycle Load | Other Load | At Solid | At Buckle | |
|---|---|---|---|---|---|---|---|
| Load | 0 | 4.285 | 19.426 | 9.9986 | 22.909 | | N |
| Load Tolerance (+/-) | 0 | 3.0787 | 3.6964 | 3.3118 | | | N |
| Length | 125.0000 | 010.000 | 57.0000 | 90.0000 | 44.8056 | | mm |
| Deflection | 0 | 15.0000 | 68.0000 | 35.0000 | 80.1944 | | mm |
| % of Max Deflection | 0 | 18.7 | 84.8 | 43.6 | 100 | | |
| Corrected Stress | 0 | 192 | 872 | 449 | 1029 | | MPa |
| Corrected % of MTS | 0 | 8.3 | 37.8 | 19.4 | 44.6 | | |
| Uncorrected Stress | 0 | 160 | 727 | 374 | 858 | | MPa |
| Uncorrected % of MTS | 0 | 6.9496 | 31.5048 | 16.2151 | 37.1546 | | |
| Expanded Coil OD | | 6.3118 | 6.3487 | 6.3264 | 6.3564 | | mm |

*Fig. 9*

FOLDABLE HEADREST SPRING COMPENSATOR

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/191,353 entitled "FOLDABLE HEADREST TUBE MOUNTED SPRING COMPENSATOR", filed May 21, 2021. The contents of the above referenced application are incorporated herein by reference.

FEDERALLY SPONSORED RESEARCH OR DEVELOPMENT

Not applicable.

FIELD OF THE INVENTION

This invention is directed to the automotive field and, in particular, to a spring compensator for use with foldable headrests.

BACKGROUND OF THE INVENTION

Consumers benefit from the multifunctional aspects of their vehicles. Vehicles that have second and third row seating are of particular interest if the seating area can be converted into a voluminous cargo holding area. Obtaining this large cargo holding area is performed by folding the seats into a storage position, wherein the backside of each folded seat functions as the floor of the cargo area.

Headrests are not required in the rear seats of vehicles, but most every vehicle manufacturer includes rear seat headrests as they provide a tremendous safety advantage to the passengers. A problem with the headrests is that they are smaller in width than the attached seat. This difference in width results in the floor provided by the folded seats having space on either side of the headrest. In addition, the size of the headrest extends the length of the seat when folded, which can inhibit compact nesting of the seats or cause large pocket areas that distract from a near continuous floor. In many instances, the headrest is physically removed to allow a seat to properly fold.

Many vehicle manufactures have evolved from requiring headrest removal to designs which allow the headrests to stay with the seat, using a secondary folding mechanism to reduce the space requirements, allowing for improved nesting of the folded seats. When the headrest is folded, the rear seats can be folded flat without compensating for a fixed headrest, which allows for tighter spacing. The result is an improved flat surface stowage area being provided, and larger seats or headrests can be employed.

Consumer friendly designs utilize a torsion spring which allows folding and unfolding of the seat with little effort. The headrests fold by compressing the torsion spring, and are typically operated when a lever on the seat is engaged to release the headset from an upright operating position. A cable inside the headrest is routed into a junction box on the seat where it connects to a pull lever. When the pull lever is retracted, the cable on the seat is engaged, which in turn pulls on a headrest cable allowing the assembly to fold around a drum cam. The torsion spring assists in returning the assembly back into an unfolded configuration suitable for passenger seating.

A problem, which this invention addresses, is that under certain conditions the torsion spring is insufficient for the task of returning the headrest to the original locked position. This is a problem that is exasperated by cold weather, age of the vehicle, excess coating on cable lines during manufacturing, improper or tortuous routing during installation, friction due to dirt or wear, or the like issues that can impede a headrest from returning from a folded position to a deployed position.

While an improperly positioned headrest is mainly an inconvenience, a headrest that is not correctly positioned can become a safety concern if the vehicle is involved in a collision. The headrest needs to be in an upright and locked position to operate as a safety device; partial placement can result in failure of the headrest's primary safety function. The torsion spring inside the headrest, which is responsible for rotating a drum cam to pull the cable back to the home position and enable locking of the headrest, can be adversely affected by cold weather, age of materials, routing or a combination thereof. It has been found that an otherwise fully functioning headrest may not lock properly when temperatures fall below −29 C because the cable retraction in the system (headrest and seat) is slowed.

Using a stronger torsion spring is not optimal, as the spring may make folding of the seat more difficult, or cause the seat to return back at an unexpected rate. Not only is a stronger torsion spring inadequate to resolve the issue, the use of a stronger spring can over stress the spring, leading to early failure of the system.

What is needed in the art is a foldable headrest tube mounted spring compensator that supports an adjustable headrest and assists with overcoming seat system demands to securely return a headrest into a lockable position from a stowage position.

PRIOR ART

DE 29614978 discloses a vehicle seat with an adjustable headrest.

DE 102007041613 discloses a coupling device for two segments for a transmission unit for a vehicle seat. A coupling device has an end fitting, which is arranged at a segment. The end fitting shrinks to a snap connection with a receiving part arranged on another segment. The receiving part has an opening that has a reversibly changed cross section. A medium is projected in the opening with which the cross section is changed. An independent claim is also included for a method for connecting two segments of a transmission unit.

DE 10339000 A1 discloses a headrest height adjusting device for motor vehicles having spaced-apart displacing devices with drive for adjusting height of received support members. At least two receptacle units receive respective support members. Each receptacle unit includes a displacing device for adjusting the height of the respective support member in the receptacle unit. The displacing devices are spaced apart. A drive is provided for producing a displacement movement. The drive may be spatially separated from the receptacle units.

DE 102005006116 A1 discloses a height adjusting device for a headrest which comprises a self-locking clamping mechanism which preferably engages on both bars of the headrest in order to clamp the headrest in a desired height position.

U.S. Patent Publication No. 2018/0326882 discloses a cable assembly for folding vehicle seats having a folding headrest which folds as the seat back is moved to a folded position. A cable interconnects a headrest folding mechanism with a stationary component, whereby movement of the seat back shifts the cable. The cable assembly includes first and second portions that are interconnected by an adjuster rod and a retainer. The adjuster rod and retainer permit interconnection of the first and second cable segments upon assembly of the headrest with the seat back in a manner that permits taking up slack in the cable assembly.

JP2008238875 discloses a cable assembly for an active headrest device that drives the headrest forward and protects an occupant in the event of a vehicle rear-end collision or the like. The cable assembly is provided with a casing cap and a control cable. The casing cap is provided with a head member and a bottom member. The head member is provided with a top wall portion, an opening portion, and a side wall portion having a pair of slits and a pair of bottom side engaging portions engaged with the pair of head side engaging portions, and a cable insertion hole. The control cable is provided with an outer casing and an inner cable. The outer casing is fixed to the cable insertion hole.

DE 19912399 A1 discloses a vehicle seat with a longitudinal adjustment device and a headrest. The vehicle seat has a seat part, with a backrest and a longitudinal adjustment device which has at least one pair of rails, consisting of a bottom rail and one opposite the bottom rail, which is displaceable in a longitudinal adjustment direction, and which is connected to the seat part, and with a headrest which is height-adjustable relative to the backrest. The headrest is connected to the floor rail via a Bowden cable so that the headrest is adjusted in height when the seat rail is displaced longitudinally with respect to the floor rail.

DE 102008055987 discloses a headrest for a vehicle seat, which has a base part, levers and headrest carrier part, where the base part is arranged on a stay bar and levers are moved by a transfer unit. A transfer device is provided for simultaneous pivoting of the levers relative to the base part by an operation of the transfer unit.

DE 102009003814 A1 discloses a cable connection device comprising a first cable and a second cable coupled to a first mechanism and a second mechanism of a vehicle seat, respectively; and each comprise an inner cable element and an outer cable element. A cable receiving member can receive end portions of the first cable and the second cable. A coupling mechanism may couple the inner cable member of the first cable to the outer cable member of the second cable within the cable receiving member. A recognition enabling device enables detection of a coupling state between the inner cable member of the first cable and the outer cable member of the second cable during a coupling operation by the coupling mechanism.

DE 10024337 A1 discloses a device for adjusting a vehicle head restraint.

DE 19940074 A1 discloses a vehicle seat with an electrically height adjustable headrest. The seat has an electrically height adjustable headrest with two guide holders in the backrest in which the headrest engages with guide rods and can be moved between retracted and deployed positions, and a drive motor that engages the headrest to drive it in and out. The drive motor engages the headrest via a force direction changing system with a flexible force transfer element.

DE 19728618 C1 discloses a head rest for a seat. The head rest has a support tube extending into a guide tube in the backrest. The support tube has a stop spring with side projections extending into spaced recesses in the guide tube to hold the head rest at set vertical positions. The stop spring can be a leaf spring with one end mounted in the guide tube and the other end having the stop projections. The leaf spring, in its locking position, is adjustable in the support tube against the force of a locking spring actuated lock body.

DE 102006019176 A1 discloses a backrest for a motor vehicle seat. The headrest has at least one section from at least one use position which can be displaced toward the head of the seat occupant into a safety position. A backrest actuation device is provided, which by means of a mechanical transmission means with a drive means for the displacement of at least a portion of the headrest is operatively connected. According to the invention, the transmission means has a first segment associated with the actuation device and a second segment associated with the drive device, which can be operatively connected to one another by means of a coupling device. The invention further relates to a vehicle seat equipped therewith and to an assembly method.

DE 10304879 A1 discloses an automobile passenger seat having a backrest and a headrest that is mounted above the backrest on a pair of posts. The backrest has a base section supported by the posts, and an occupant engagement contact section supported by the base section so that it can perform relative translational movement along a pair of rails provided on the base section. In response to an appropriate control signal, such as tensioning a Bowden cable in response to an applied force, the contact portion moves under articulation against a return spring bias and away from the base portion. The translational movement of the contact section relative to the base section serves to control the inclination of the contact surface over the entire range of movement of the contact section relative to the base section.

DE 102012012657 A1 discloses a vehicle seat having a coupling arrangement for coupling a Bowden cable with another Bowden cable on or in a coupling element, where receivers of the coupling element is formed such that a coupling unit of the latter Bowden cable is applied in the receivers of the coupling element to receiving the element by insertion of the latter Bowden cable. The receiving element holds the coupling unit in a coupling position.

DE 102004048910 A1 discloses an actuator for a crash-active headrest.

DE 102005006116 A1 discloses an adjustment device for a headrest comprising a self-clamping mechanism which engages, preferably on both bars of the headrest, to clamp the headrest at a desired height position. With the clamping mechanism is an actuating mechanism, preferably in the form of a Bowden cable assembly, coupled to release the clamping mechanism and to allow a height adjustment of the headrest.

DE 102013010705 A1 discloses a headrest which comprises a first component and a second component. The first component is operatively connected to a Bowden cable in such a way that, in the event of an accident, the first component is moved into a safety position relative to the second component.

SUMMARY OF THE INVENTION

Disclosed is an improvement to vehicle headrest remote actuators. In particular, the improvement operates in combination with a conventional headrest/seat torsion spring assembly. The spring compensator of the instant invention compensates for the lack of force routinely experienced with conventional headrest remote actuators due to cold weather use, aging of the vehicle, or other actuator impediments. The spring compensator provides a boost to help pull the remote actuator cable up through the seat when the headrest is returned from a stowage position. Mounting of the spring compensator inside a headrest tube allows the use of a smaller torsion spring in the headrest remote actuator, and reduces the stress on the actuator.

An objective of the invention is to provide a spring compensator for use with a foldable headrest, the spring compensator integrates into the headrest support tube and assists with overcoming headrest return difficulties.

Another objective of the invention is to provide a spring compensator for a foldable headrest that allows for design simplification and reduction of components in the remote actuator mechanism.

Still another objective of the invention is to reduce force/stress at the cable drum and rear cover mounting position.

Yet another objective of the invention is to interrupt the friction chain of the torsion spring system by making the system two parts.

A benefit of the invention is the concealment of the spring compensator within the headrest support tube.

Another benefit of the invention is the ease of assembling a spring compensator within the headrest assembly, eliminating the need for a stronger torsion spring.

Still another benefit of the invention is the versatility of spring design (forces) based on system demands.

Yet still another benefit of the invention is that the requirement of the seat folding mechanism can be fulfilled by adapting the power of a spring, reducing force/stress at the cable drum and rear cover mounting position.

Other objectives, benefits and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 9 is an example calculation page of the dimensional parameters of the spring using round wire 0.7112 mm.

DESCRIPTION OF THE PREFERRED EMBODIMENT

It is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
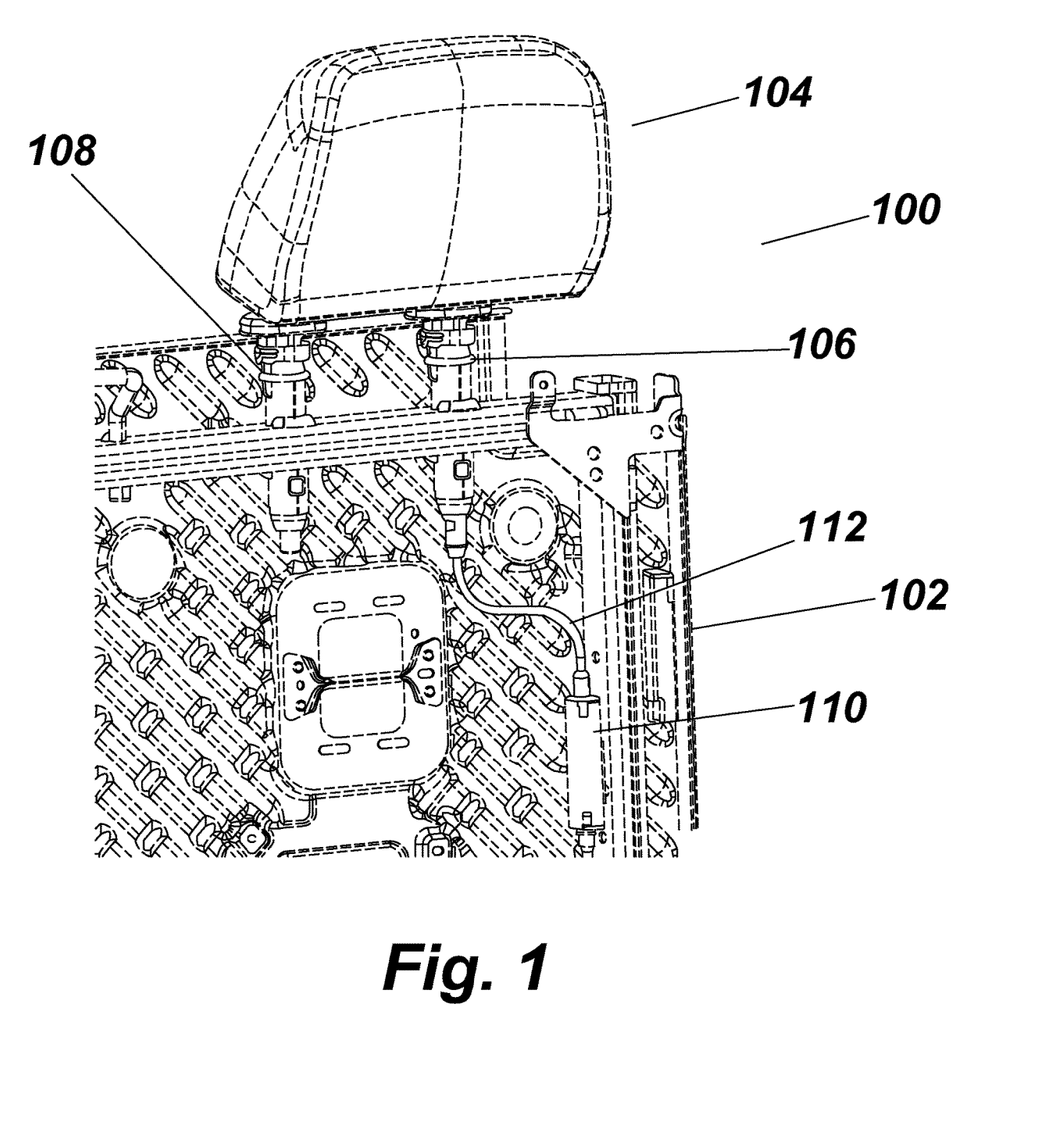
FIG. 1 is a pictorial view of a foldable headrest mounted to a seat assembly.

Referring to FIG. 1, illustrated is a seat assembly 100 having a seat back 102 for use in securing a headrest 104 by first and second support tubes 106, 108. The first support tube 106 is constructed and arranged to house the instant spring compensator to enhance the return of a lock mechanism release 110 that is illustrated with a cable jacket 112 coupled to the spring compensator, wherein the aggressive bend results in a tortuous path for the internal cable, making it susceptible to friction inducing variables, including cold weather operation.

Referring to the figures, depicted is the spring compensator 10 to complement and improve upon the remote actuator used for a foldable headrest. The spring compensator 10 is positioned within a headrest support tube that attached to a vehicle seat support frame. The headrest is mounted above the upper edge of the seat support frame and can be folded over, allowing the seat support frame to be placed in a horizontal position, with spacing required by the headrest kept to a minimum. The remote actuator typically consists of a release mechanism that is accessible on the side edge of the seat support frame, or mounted to a vehicle seat portion; the release mechanism operating a flexible cable that is jacketed and typically follows a tortuous path before coupling to the headrest support tube. The jacketed cable causes a restriction of cable movement which is especially noticeable in cold air operations.

Referring to the figures in general, the spring compensator 10 comprises a flexible cable 12 having a first connector end 14 spaced apart from a second connector end 16. The flexible cable 12 is coupled in line with the remote actuator 110 used to fold a vehicle seat headrest 104. The spring compensator 10 includes a guide sleeve 20 attached to the flexible cable 12. The guide sleeve 20 is formed from a first sidewall 22 spaced apart from a second sidewall 24 by an outer edge 26. The outer edge 26 is constructed and arranged to slide within a headrest support tube 106. The guide sleeve 20 outer edge 26 includes a plurality of tabs 28 for engaging an inner surface 114 of the headrest support tube 106. The tabs 28 reduce the amount of area that can frictionally engage the headrest support tube 106. In a preferred embodiment, the tabs 28 on the guide sleeve 20 outer edge 26 provide spacing of about 0.10 mm between the outer edge 26 of the guide sleeve 20 and the inner surface 114 of the headrest support tube 106.

The guide sleeve 20 first sidewall 22 includes a protrusion 30 that extends outwardly from the first sidewall 22 and includes a passageway 32 providing an aperture between the first and second sidewalls 22, 24. The passageway 32 allows for receipt of the flexible cable 12. In one embodiment, the guide sleeve 20 is constructed from metal and the cable is secured to the passageway at a fixed position on the cable 12. In a preferred embodiment, the guide sleeve 20 is constructed of plastic and employs a metal stop ball 34 secured to the cable 12 being positioned along a length of the cable 12 to prevent movement of the guide sleeve 20 when the coil spring 40 is engaged and compressed. The guide sleeve protrusion 30 has an outer sidewall 36 for securement to a first end of the spring 40; the outer sidewall 36 having a plurality of ribs constructed and arranged to secure to a first end 42 of the coil spring 40. The ribs 38 are arranged to aide in minimizing spring noise during coil spring engagement. The second end 44 of the coil spring 40 is fixed in position by the spring biasing force against the end connector 16.

Figure 2:
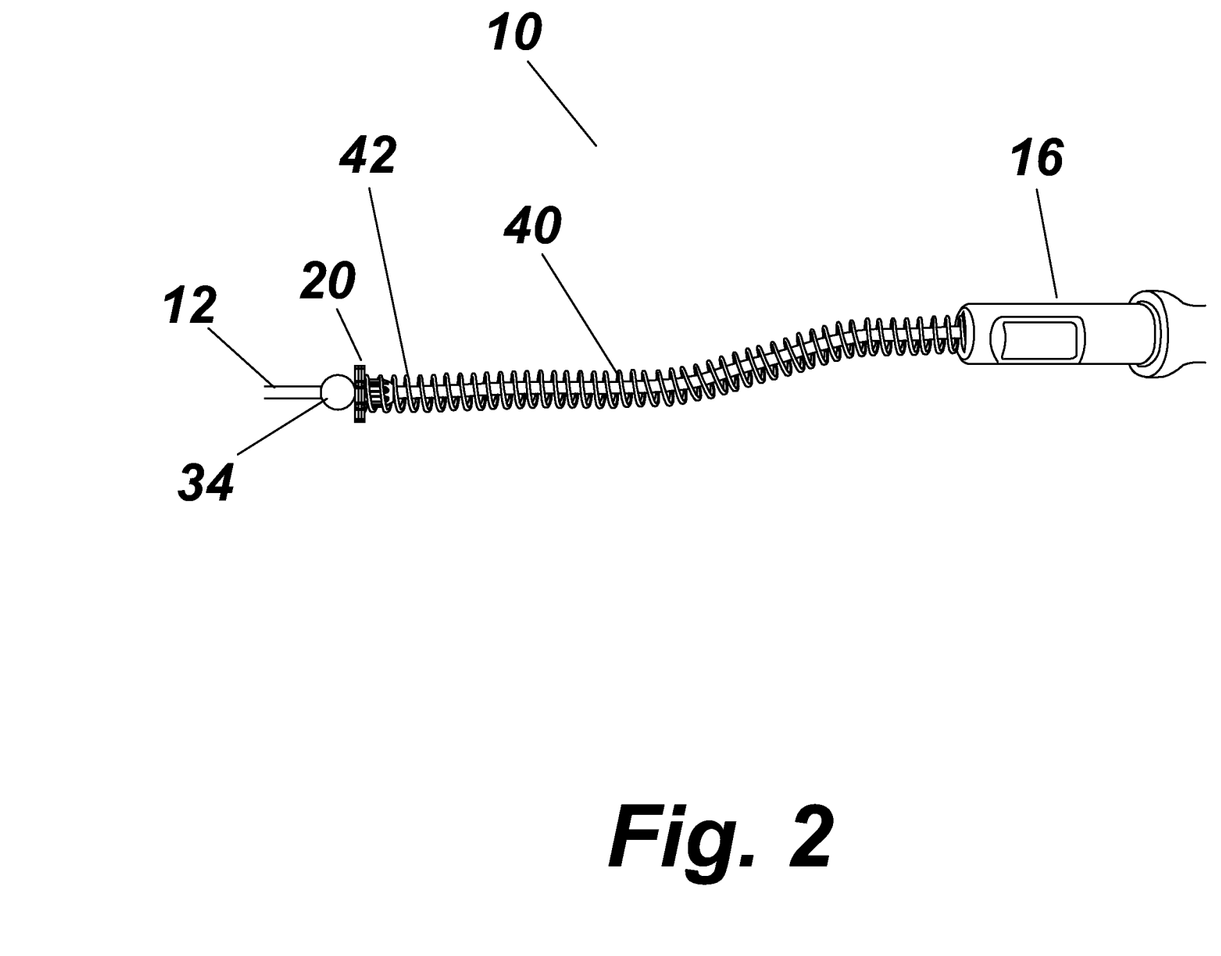
FIG. 2 is a plane view of the spring compensator.
Figure 3:
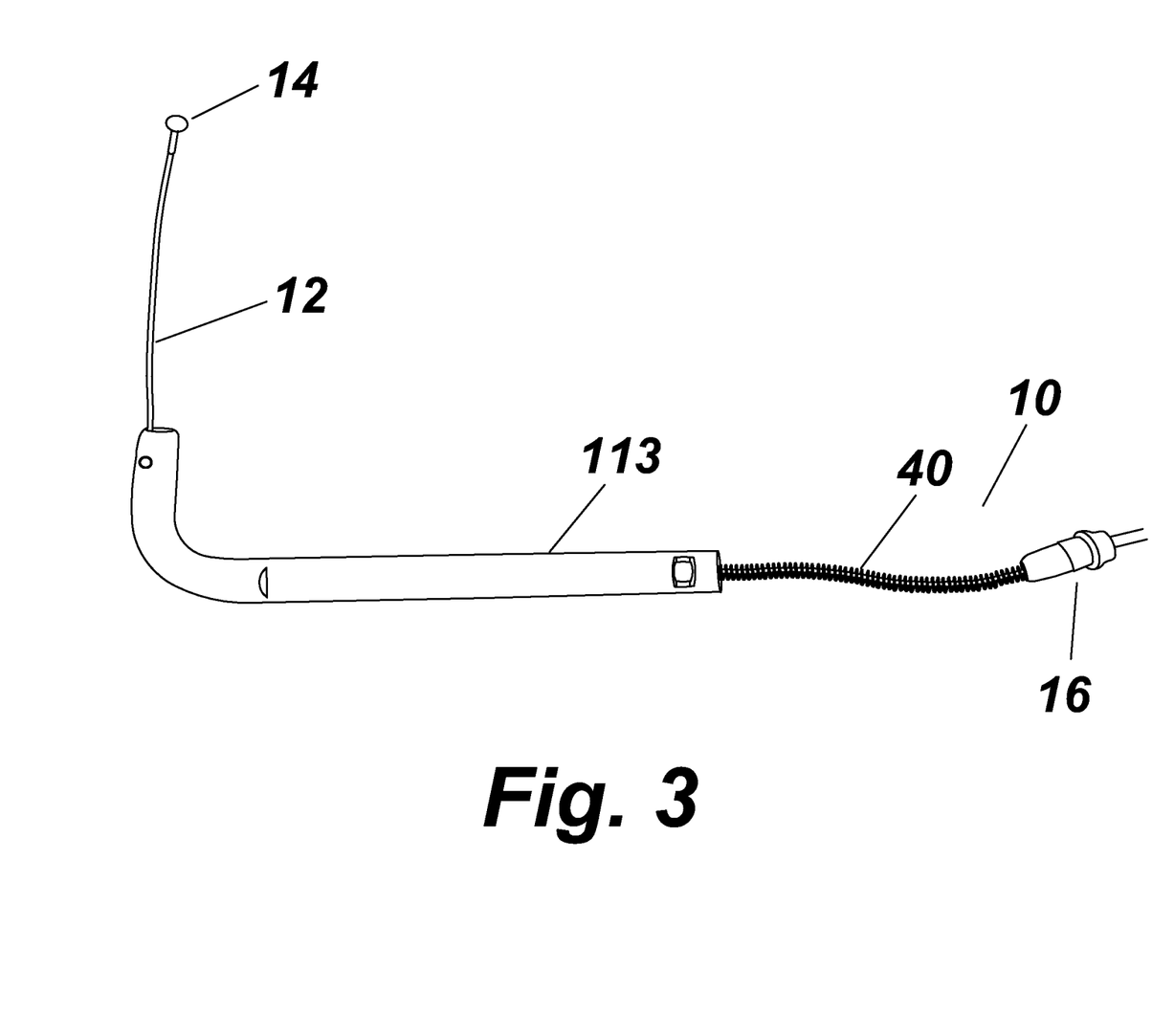
FIG. 3 is a plane view of the spring compensator partially inserted into a fixed headrest support tube.
Figure 4:
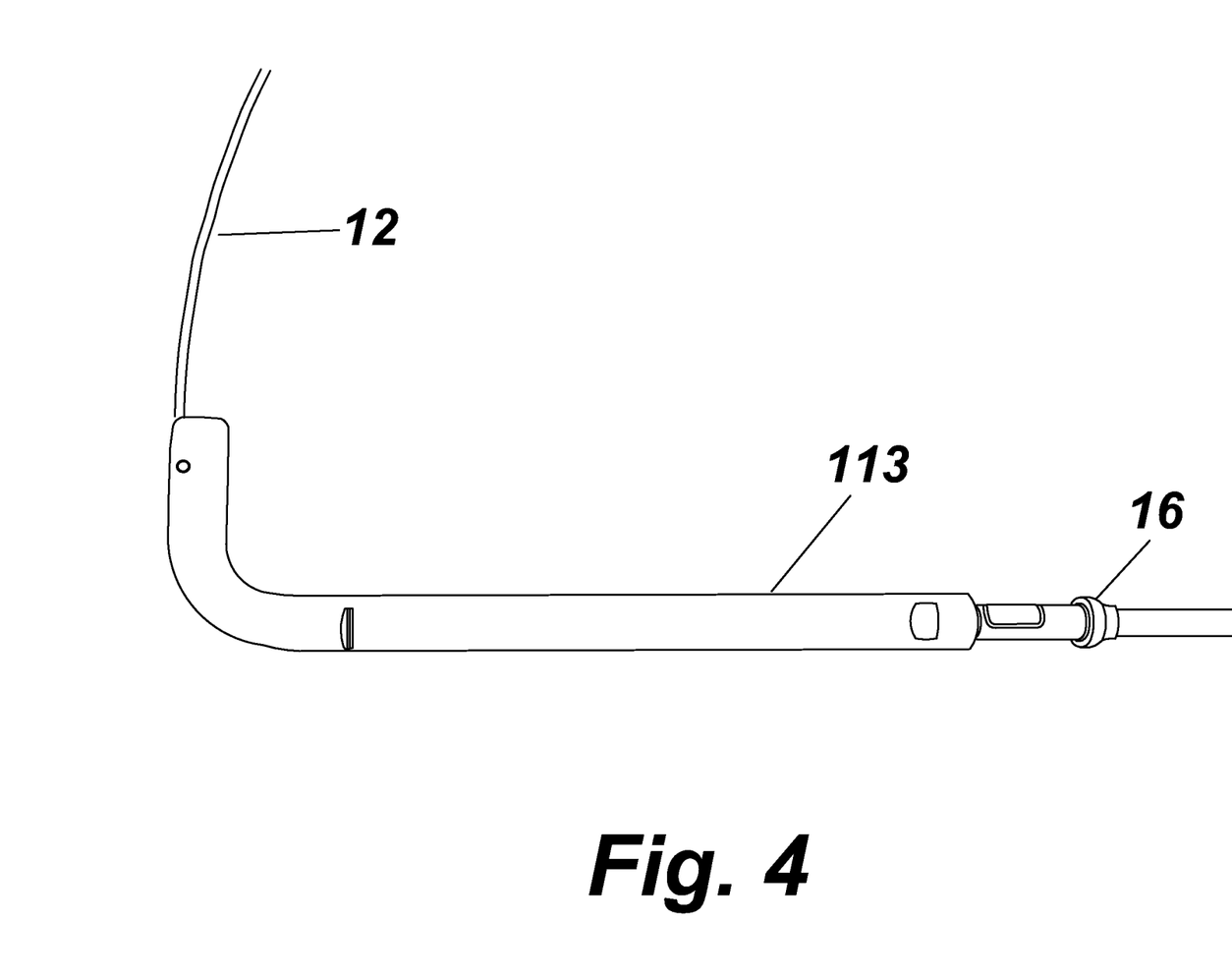
FIG. 4 is an enlarged view of the spring compensator inserted into the headrest support tube.
Figure 5:
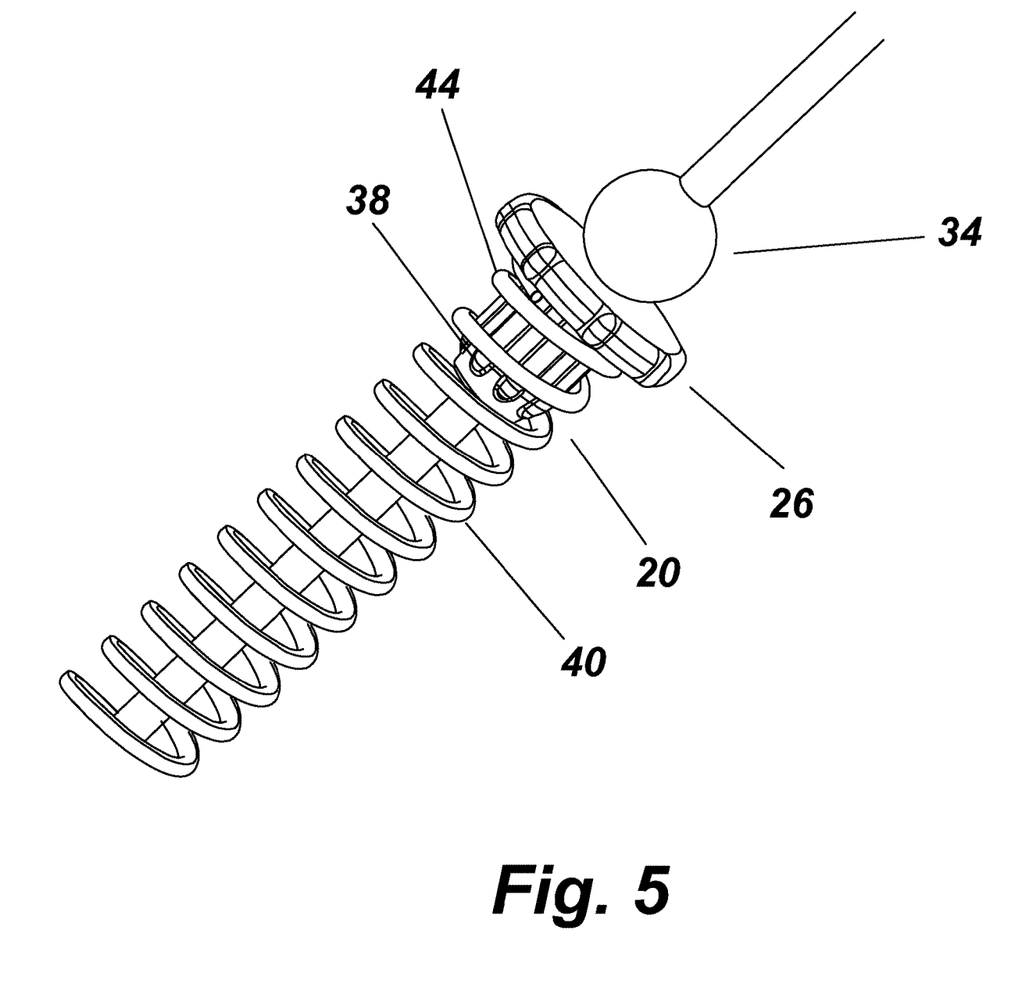
FIG. 5 is a perspective view of the spring compensator guide sleeve and spring.
Figure 6:
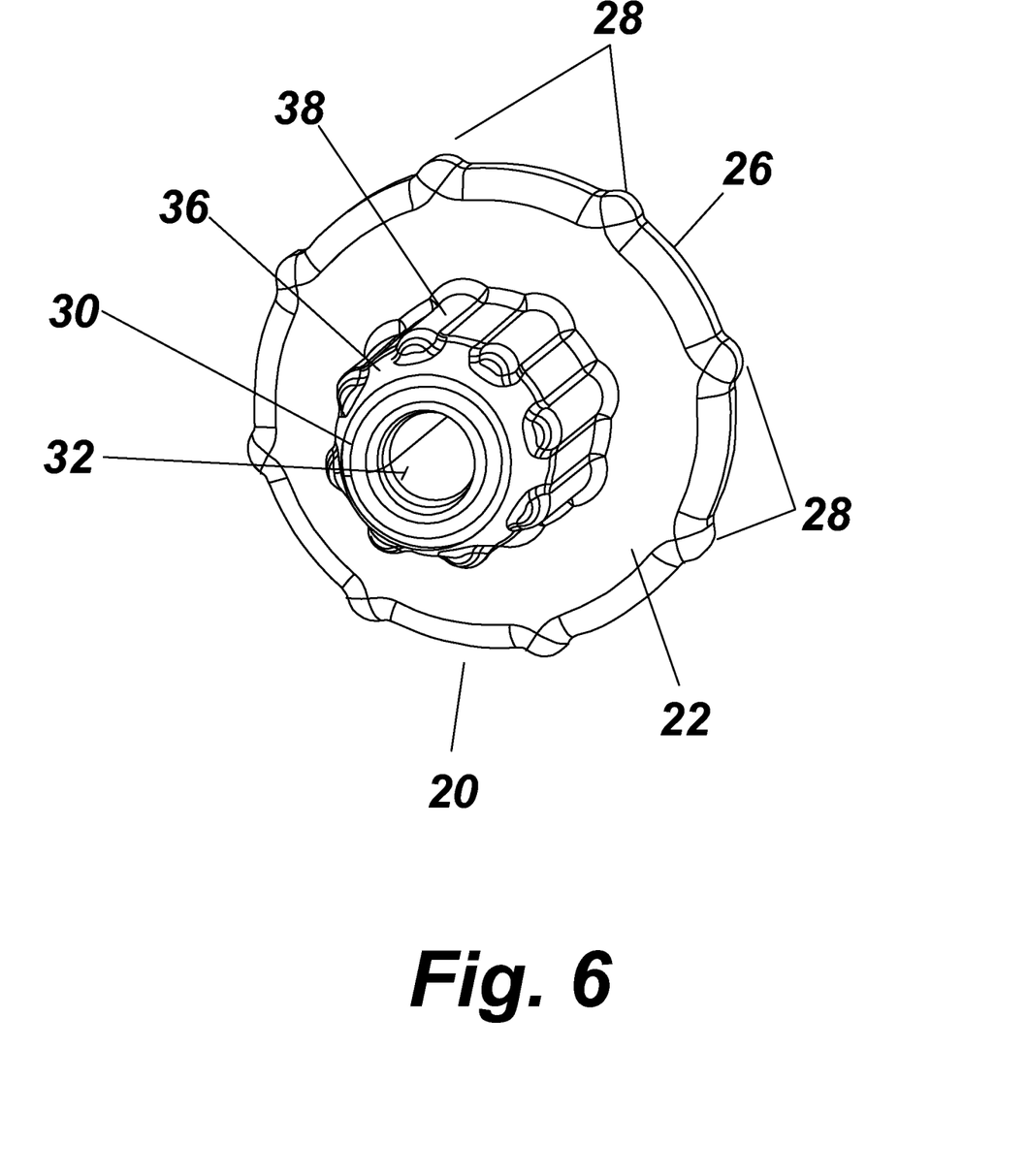
FIG. 6 is a perspective view of the guide sleeve.
Figure 7:
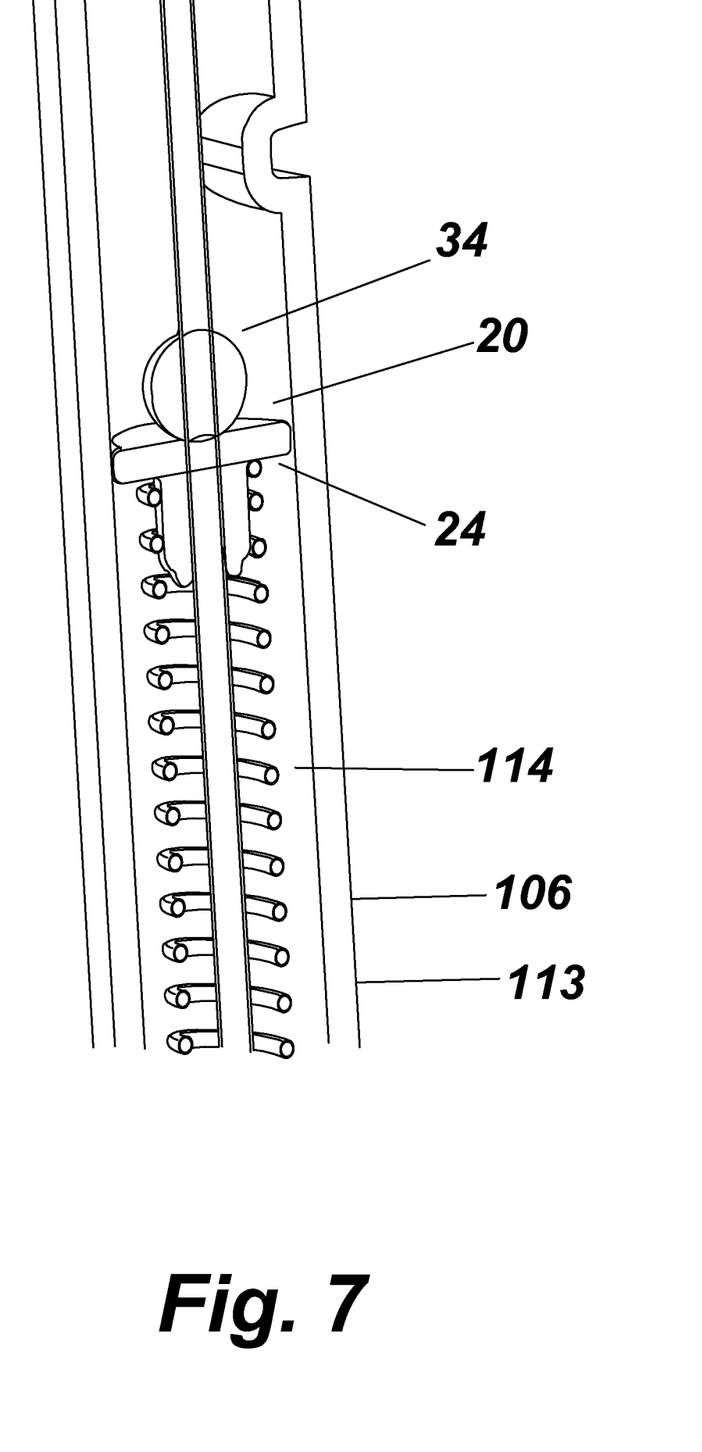
FIG. 7 is a cross-sectional side view of the spring compensator within the headrest support.
Figure 8:
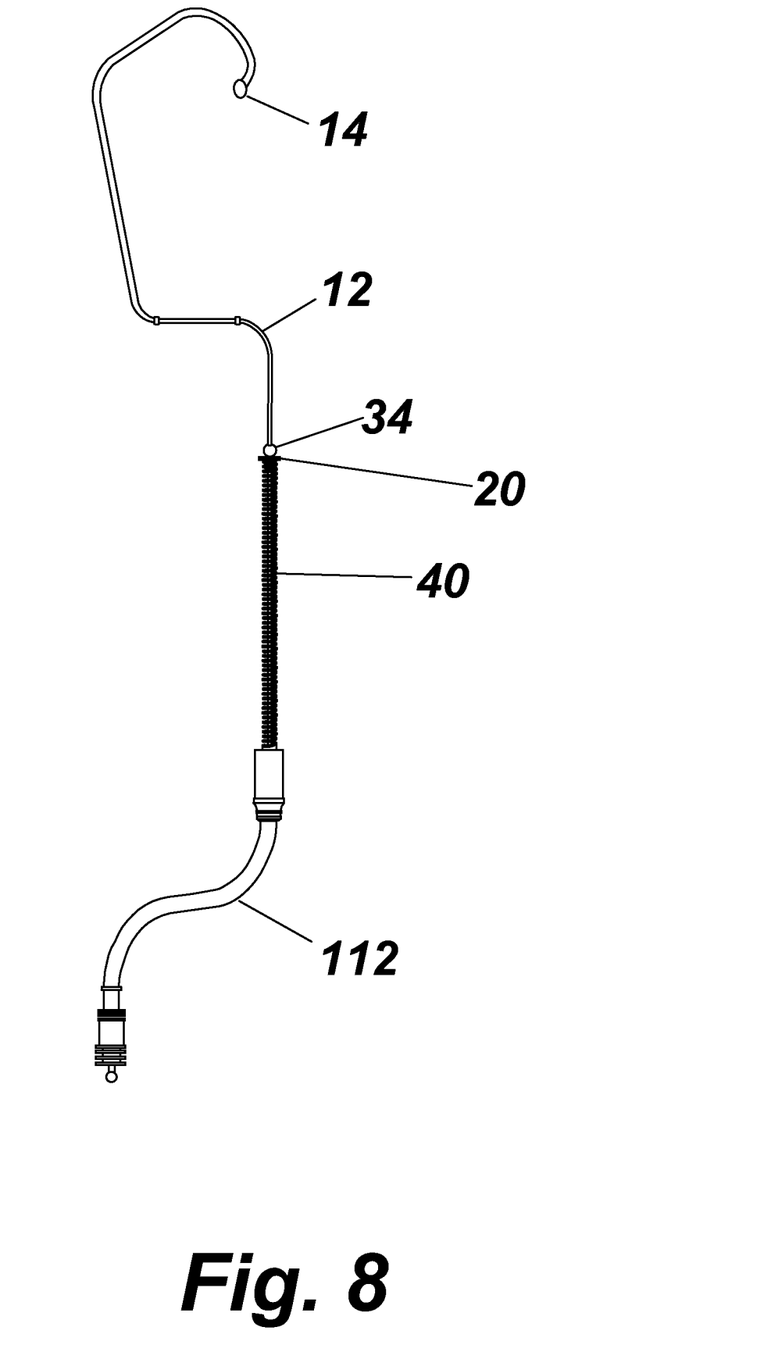
FIG. 8 is an illustration of the spring compensator for use with a flexible cable.

In the preferred embodiment, the spring compensator 10 is juxtapositioned to a jacketed cable 112 that may be placed in a tortuous path of a remote actuator 110. The folding of the headrest from an operating position to a stowage position compresses the coil spring 40 during the stowage movement. The unfolding of the headrest from a stowage position to an operating position is assisted by the coil spring 40 which provides a force through the flexible cable 12 to assist the cable movement within the jacketed cable housing 112 to allow effortless return to the operating position and locked position. FIG. 2 depicts the inner tube 113 of the headrest support tube 106. In the preferred embodiment, the coil spring 40 has a wire diameter of 0.7112 mm with 60 active coils.

Calculation of size and cycle loading for a coil spring having a wire diameter of 0.7112 mm with 60 active coils can be provided. In this example, the wire length is 1037.7191 mm with a spring rate of 0.2857 N/mm. The coil outer diameter is 6 mm with a pitch of 2.0478, having a pitch angle of 7.0261 degrees. The estimated cycle life is 6326477.78 cycles. While the preferred embodiment employs a metal spring, it is contemplated that an elastomer may be employed in place of metal and deemed within the scope of this invention.

The spring compensator 10 is inserted concentrically within the headrest support tube 106 that supports the adjustable headrest 104 to boost or compensate for the lack of force routinely experienced under cold weather use. The spring compensator 10 positioned inside the headrest support tube 106 will help pull the cable 12 up through the seat when the seat and headrest are returned from a stowage position to a passenger seating position.

The integration of a spring compensator 10 inside the headrest support tube 106 assists in overcoming seat system demands with benefits that include: 1) Ease of assembly (spring assembled to cable) within the headrest mechanism; 2) Versatility of spring design (forces) based on system demands; 3) Packaging space in the headrest tube to accommodate a large cable stroke; 4) Allowing for design simplification and reduction of components in the mechanism; 5) Reduction of force/stress at cable drum and rear cover mounting position; 6) Concealment/protection by the headrest tube; 7) The spring system at the "end of the headrest relocking system" is interrupting the friction chain of the whole system into two parts; 8) The requirement of the seat folding mechanism can be fulfilled by adapting the power of the spring; and 9) The requirement of the seat folding mechanism has no impact to the power of the cable drum.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A spring compensator which is capable of being used with a headrest and juxtaposed with a jacketed cable, said spring compensator comprising:
   a flexible cable having a first connector end spaced apart from a second connector end, said flexible cable coupled in line with a remote actuator used to fold a vehicle seat headrest;
   a coil spring encasing a portion of said flexible cable;
   a guide sleeve formed frorz a first sidewall spaced apart from a second sidewall by an outer edge constructed and arranged to slide within a headrest support tube, said guide sleeve first sidewall including a protrusion extending outwardly therefrom with a passageway between said first and second sidewalls for slidable receipt of said flexible cable, said protrusion having an outer sidewall for securement to an end of the coil spring; and
   a plurality of ribs laced within said guide sleeve, said ribs constructed and arranged to secure to said coil spring to aide in minimizing spring noise during coil spring engagement.

2. The spring compensator according to claim 1 wherein said guide sleeve outer edge includes a plurality of tabs for engaging an inner surface of a headrest support tube, wherein said tabs reduce frictional engagement between said guide sleeve and said headrest support tube.

3. The spring compensator according to claim 2 wherein. said tabs on said guide sleeve outer edge provide spacing of about 0.10 mm between said guide sleeve outer edge and the inner surface of a headrest support tube.

4. The spring compensator according to claim 1 wherein said guide sleeve is constructed from plastic.

5. The spring compensator according to claim 1 including a stop ball secured to said cable, said stop ball positioned along a length of said cable to prevent movement of said guide sleeve when said coil spring is engaged and compressed.

6. The spring compensator according to claim 5 wherein said stop ball is constructed from metal and secured to a fixed position on said cable.

7. The spring compensator according to claim 1 wherein said guide sleeve is constructed from metal and secured to said cable.

8. The spring compensator according to claim 1 wherein said coil spring is compressible.

\* \* \* \* \*